United States Patent
Niedermann (10) Patent No.: US 11,932,065 B2
(45) Date of Patent: Mar. 19, 2024

(54) EASY TRAILER HITCH ATTACHMENT HOLD-DOWN DEVICE

(71) Applicant: Jeff Niedermann, Marshalltown, IA (US)

(72) Inventor: Jeff Niedermann, Marshalltown, IA (US)

( * ) Notice: Subject to any disclaimer, the term of this patent is extended or adjusted under 35 U.S.C. 154(b) by 347 days.

(21) Appl. No.: 17/217,988

(22) Filed: Mar. 30, 2021

(65) Prior Publication Data
US 2021/0300134 A1    Sep. 30, 2021

Related U.S. Application Data (60) Provisional application No. 63/001,740, filed on Mar. 30, 2020.

(51) Int. Cl.
  *B60D 1/07*   (2006.01)
  *B60D 1/167*  (2006.01)

(52) U.S. Cl.
  CPC ............. *B60D 1/075* (2013.01); *B60D 1/167* (2013.01)

(58) Field of Classification Search
  CPC .......... B60D 1/07; B60D 1/141; B60D 1/167; B60D 1/36; B60D 1/187; B60D 1/075
  See application file for complete search history.

(56) References Cited

U.S. PATENT DOCUMENTS

| | | | | |
|---|---|---|---|---|
| 5,941,665 A * | 8/1999 | Dahlin | ................... | B60P 3/075 410/20 |
| 6,382,891 B1 * | 5/2002 | Bellis, Jr. | .............. | B60P 7/0807 410/3 |
| 6,626,621 B1 * | 9/2003 | Hugg | ..................... | B60P 7/083 410/106 |
| 2003/0137124 A1 * | 7/2003 | Marchese | ............. | B60P 3/1075 280/414.1 |
| 2004/0119881 A1 * | 6/2004 | Matko | .................... | B60R 11/04 348/375 |
| 2005/0220557 A1 * | 10/2005 | Rorie | ....................... | B60P 3/00 410/7 |
| 2010/0276907 A1 * | 11/2010 | Scarola | .................... | B60D 1/04 280/507 |
| 2016/0229242 A1 * | 8/2016 | Swartz | .................... | B60D 1/06 |

\* cited by examiner

*Primary Examiner* — Kevin Hurley
*Assistant Examiner* — Hosam Shabara
(74) *Attorney, Agent, or Firm* — Patwrite Law; Mark David Torche (57) ABSTRACT

A trailer hitch attachment hold-down device for providing attachment points to a trailer frame has a trailer attachment plate that has a central portion and two side portions and a ratchet tie-down rotatably connected to the trailer attachment plate. In one embodiment the trailer attachment plate is angled downward. In one embodiment the trailer attachment plate is secured to a trailer frame by inserting a trailer ball through a trailer ball opening in the trailer attachment plate. In another embodiment, the trailer attachment plate is secured by using a lower attachment plate and bolts to clamp the trailer frame between the attachment plate and the lower attachment plate. In another embodiment, a standoff attachment bracket is provided that clamps the trailer frame between the lower portion of the bracket and an attachment plate using bolts. A ratchet tie-down is attached to the upper portion of the bracket.

14 Claims, 12 Drawing Sheets

EASY TRAILER HITCH ATTACHMENT HOLD-DOWN DEVICE

CROSS REFERENCE TO RELATED APPLICATIONS

This application claims priority and herein incorporates by reference U.S. provisional patent application 63/001,740, filed Mar. 30, 2020.

BACKGROUND OF THE INVENTION

Trailers are a very useful and economic way to carry things. One of the reasons for their utility is the fact that they can be pulled by many different types of vehicles including animals without the need to have a dedicated carrying vehicle. Although trailers are extremely useful in carrying things, it is often a problem to keep the materials being carried secure within the trailer.

Many solutions to this problem are available such as tarps, ropes, elastic cords, chains and tie-downs. Although these solutions help, they all require a place to attach the securing means to the trailer. There is a need for a way to provide proper secure attachment hold-down places to secure items on a trailer without the need for the trailer to have any built-in hold-down attachment locations.

SUMMARY OF THE INVENTION

A trailer hitch attachment hold-down device for providing attachment points to a trailer frame has a trailer attachment plate that has a central portion and two side portions and a ratchet tie-down rotatably connected to the trailer attachment plate. In one embodiment the trailer attachment plate is angled downward. In one embodiment the trailer attachment plate is secured to a trailer frame by inserting a trailer ball through a trailer ball opening in the trailer attachment plate. In another embodiment, the trailer attachment plate is secured by using a lower attachment plate and bolts to clamp the trailer frame between the attachment plate and the lower attachment plate. In another embodiment, a standoff attachment bracket is provided that clamps the trailer frame between the lower portion of the bracket and an attachment plate using bolts. A ratchet tie-down is attached to the upper portion of the bracket.

Other features and advantages of the instant invention will become apparent from the following description of the invention which refers to the accompanying drawings.

DETAILED DESCRIPTION OF THE INVENTION

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Figure 1:
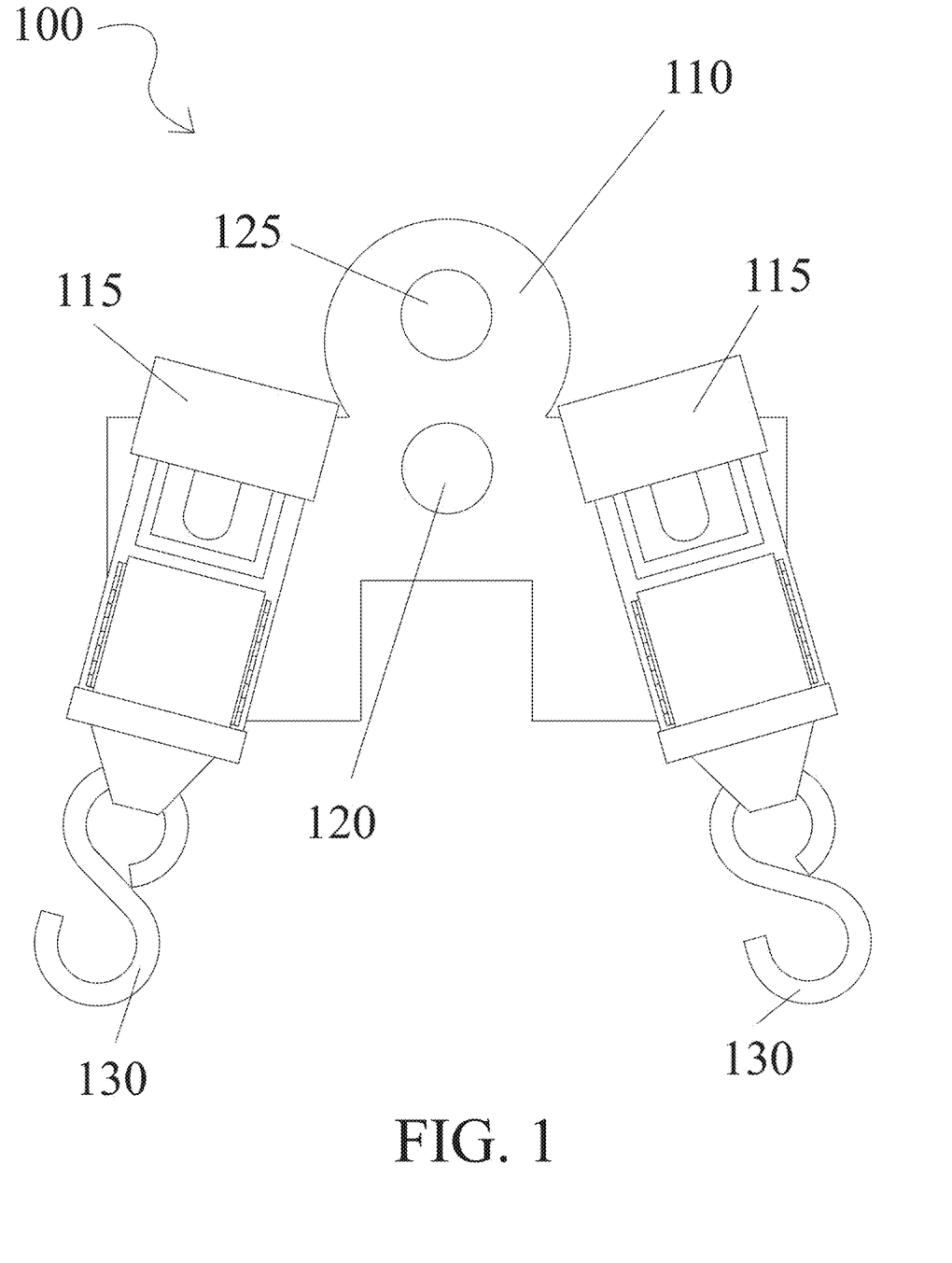
FIG. 1 is a top view of an easy trailer hitch attachment hold-down device according to an embodiment of the invention.
Figure 2:
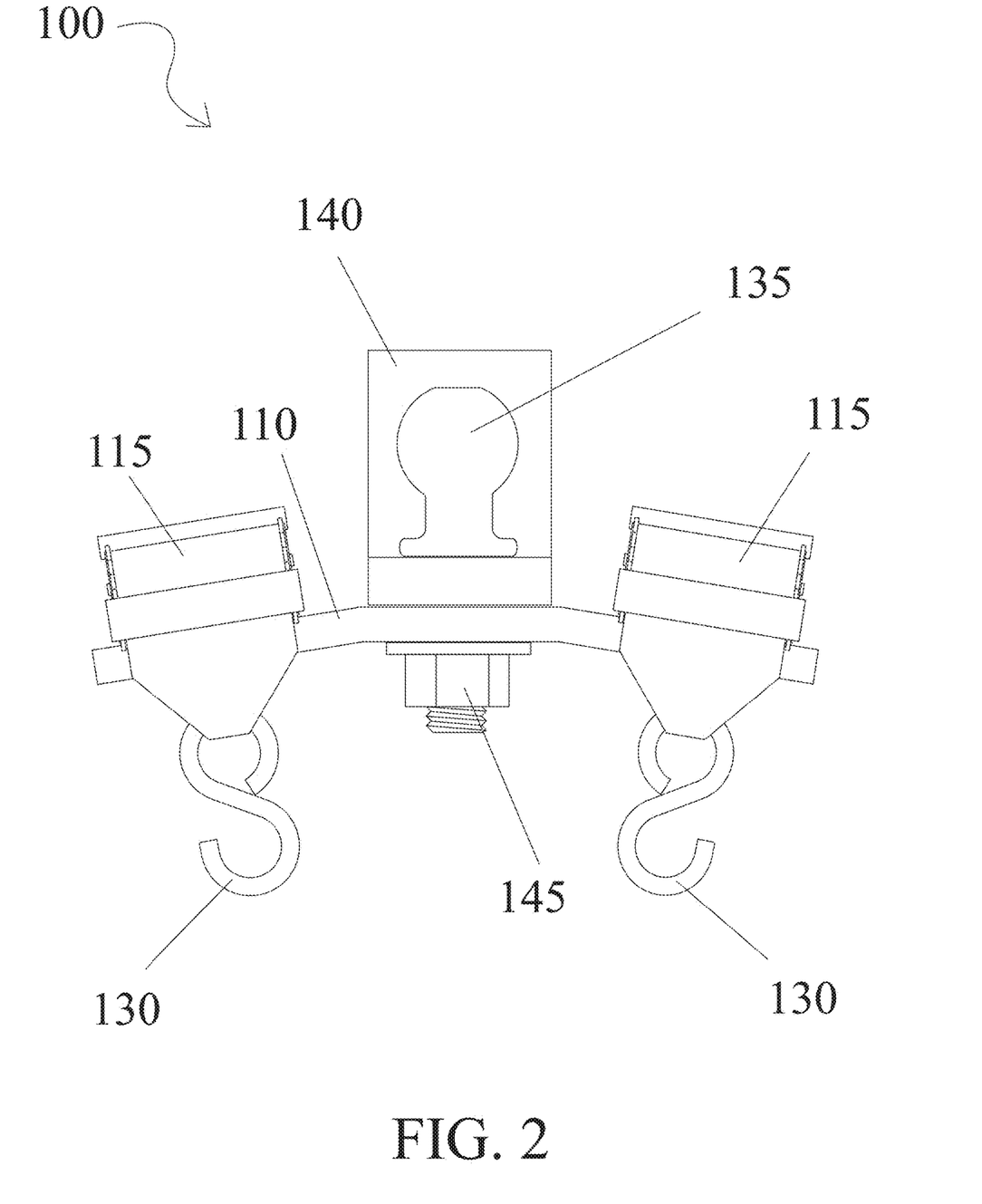
FIG. 2 is a front view of the easy trailer hitch attachment hold-down device shown in FIG. 1.

Referring to FIGS. 1 and 2, an easy trailer hitch attachment hold-down device 100 is shown having a trailer attachment plate 110 which is attached to a trailer tongue 140 using a trailer ball 135 and trailer ball attachment nut 145. A pair of ratchet tie-downs 115 are attached to trailer attachment plate 110. Ratchet tie-downs 115 are bolted (not shown) to trailer attachment plate 110. Ratchet tie-downs 115 may be bolted in such a way that allows them to pivot or may be fixed in place. Of course other means of attaching ratchet tie-downs 115 to trailer attachment plate 110 such as, but not limited to, welding, pins or clips, may be used as is known in the art.

Trailer attachment plate 110 has a hold-down opening 125 which is used to attach other tie-downs, ropes or cables, etc. (not shown). A trailer hitch ball opening 120 is used to attach trailer attachment plate 110 to trailer tongue 140. Each of ratchet tie-downs 115 has a hook 130 to allow attachment to openings as is known in the art. Trailer attachment plate 110 is shown having a central portion and two angled side portions where ratchet tie-downs 115 are attached.

Although trailer attachment plate 110 is shown being angled downward, it is understood that other angles or no angle could be used as long as trailer attachment plate 110 is securely attached to trailer tongue 140.

Figure 3:
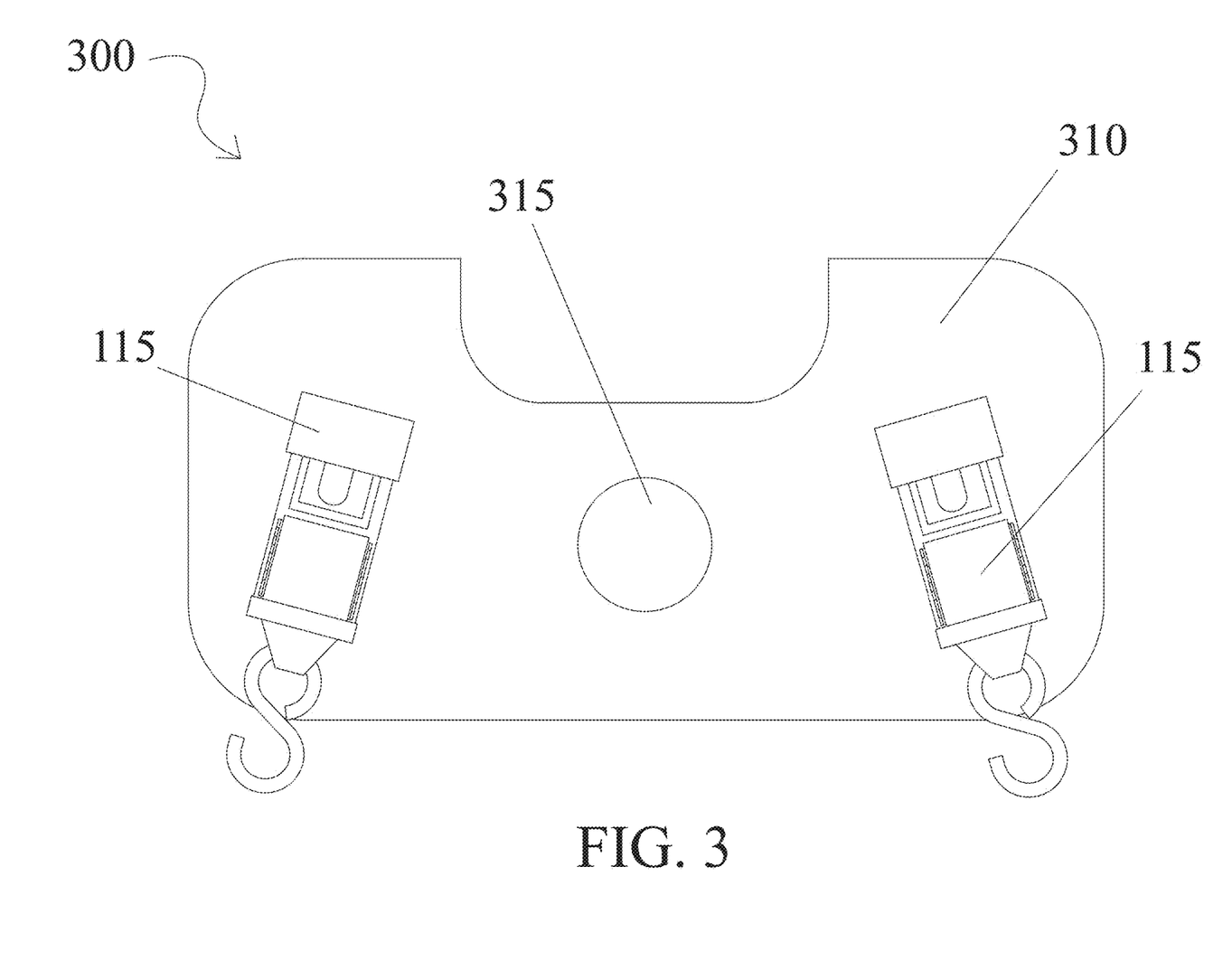
FIG. 3 is a side view of a slip over easy trailer hitch attachment hold-down device according to an embodiment of the invention.
Figure 4:
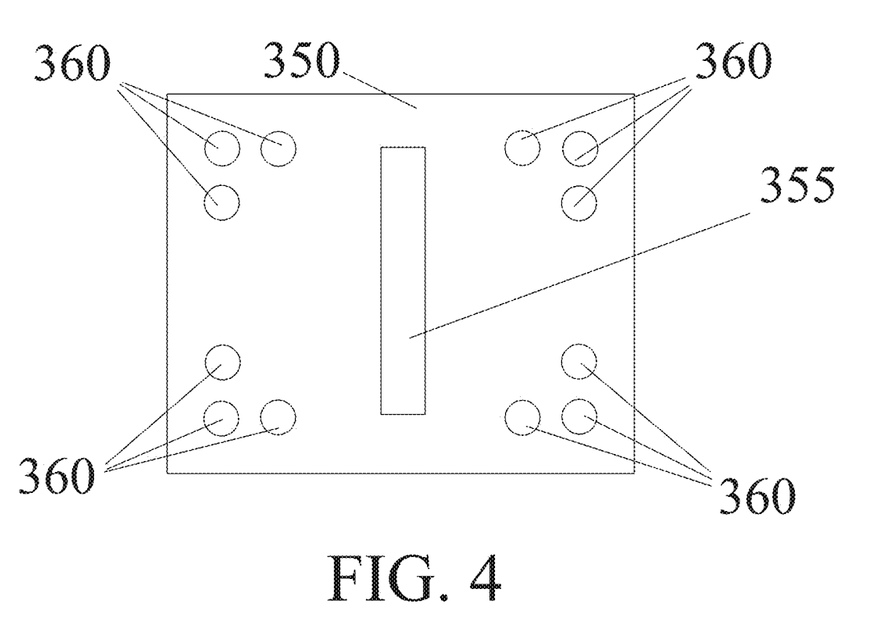
FIG. 4 is a top view of a top tongue mounting plate according to an embodiment of the invention.
Figure 5:
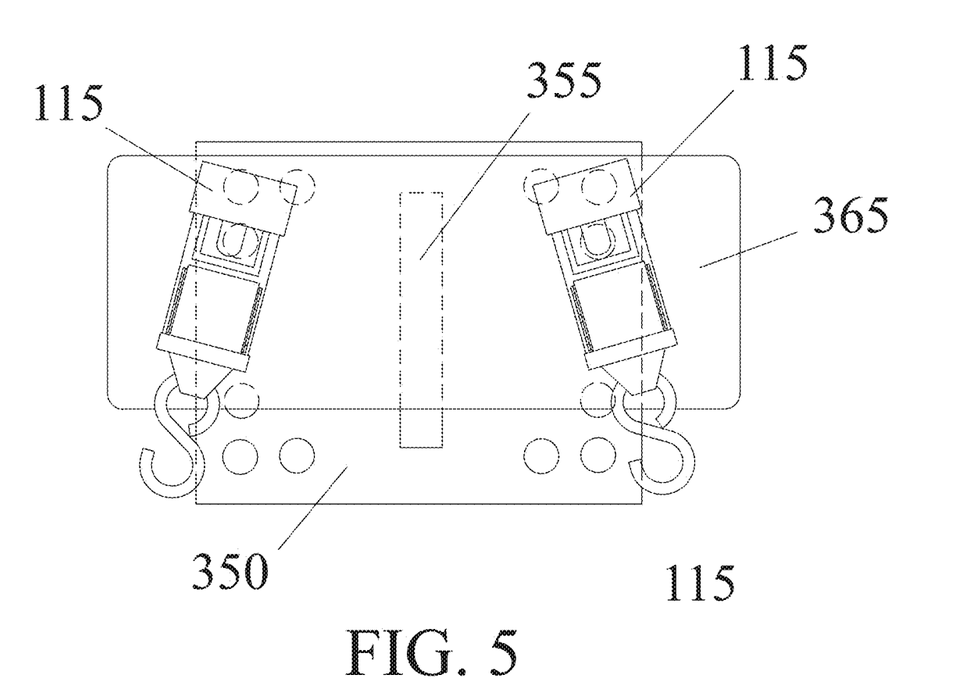
FIG. 5 is a top partially transparent view of an easy trailer hitch attachment hold-down device according to an embodiment of the invention.
Figure 6:
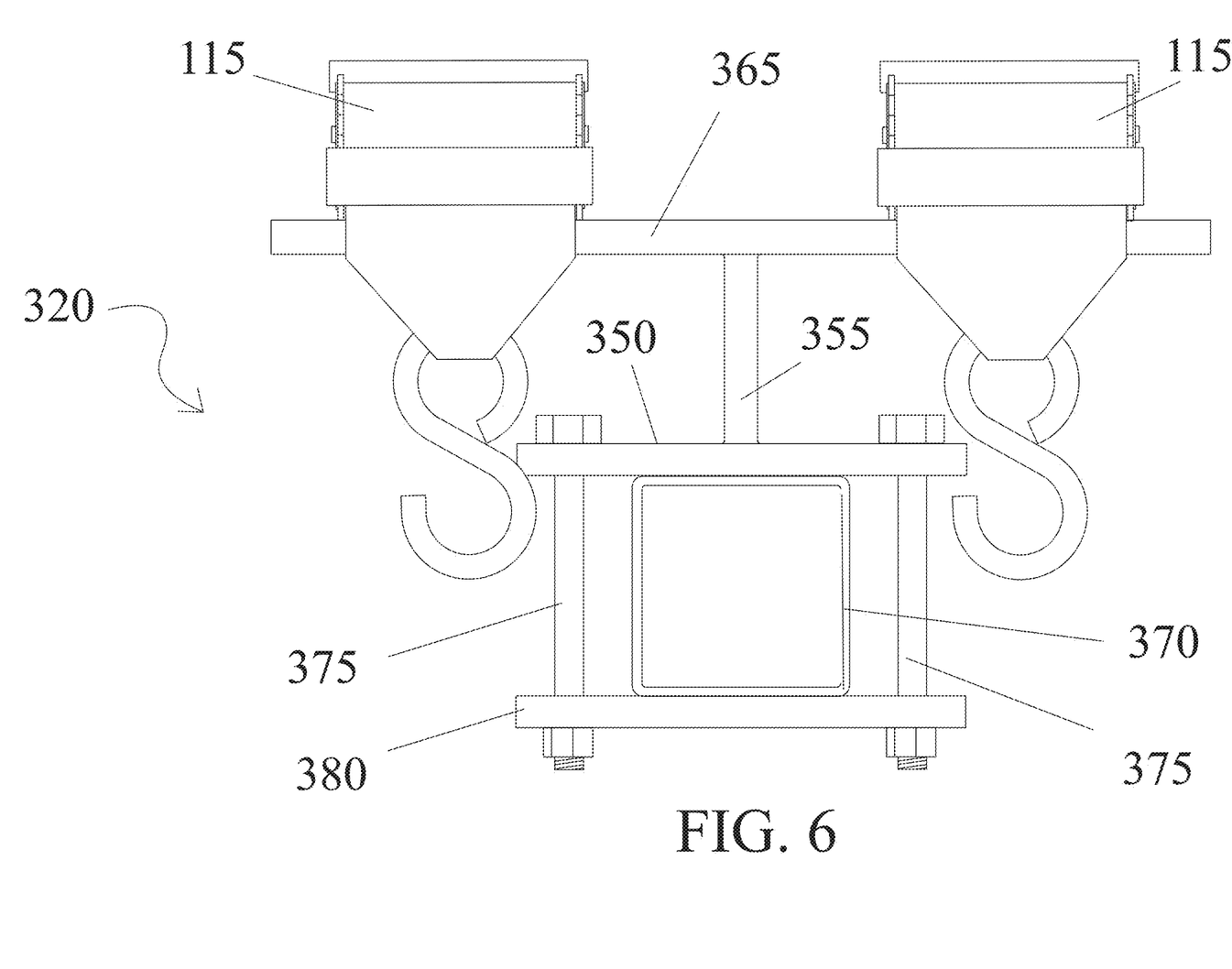
FIG. 6 is a front view of the easy trailer hitch attachment hold-down device shown in FIG. 5.
Figure 7:
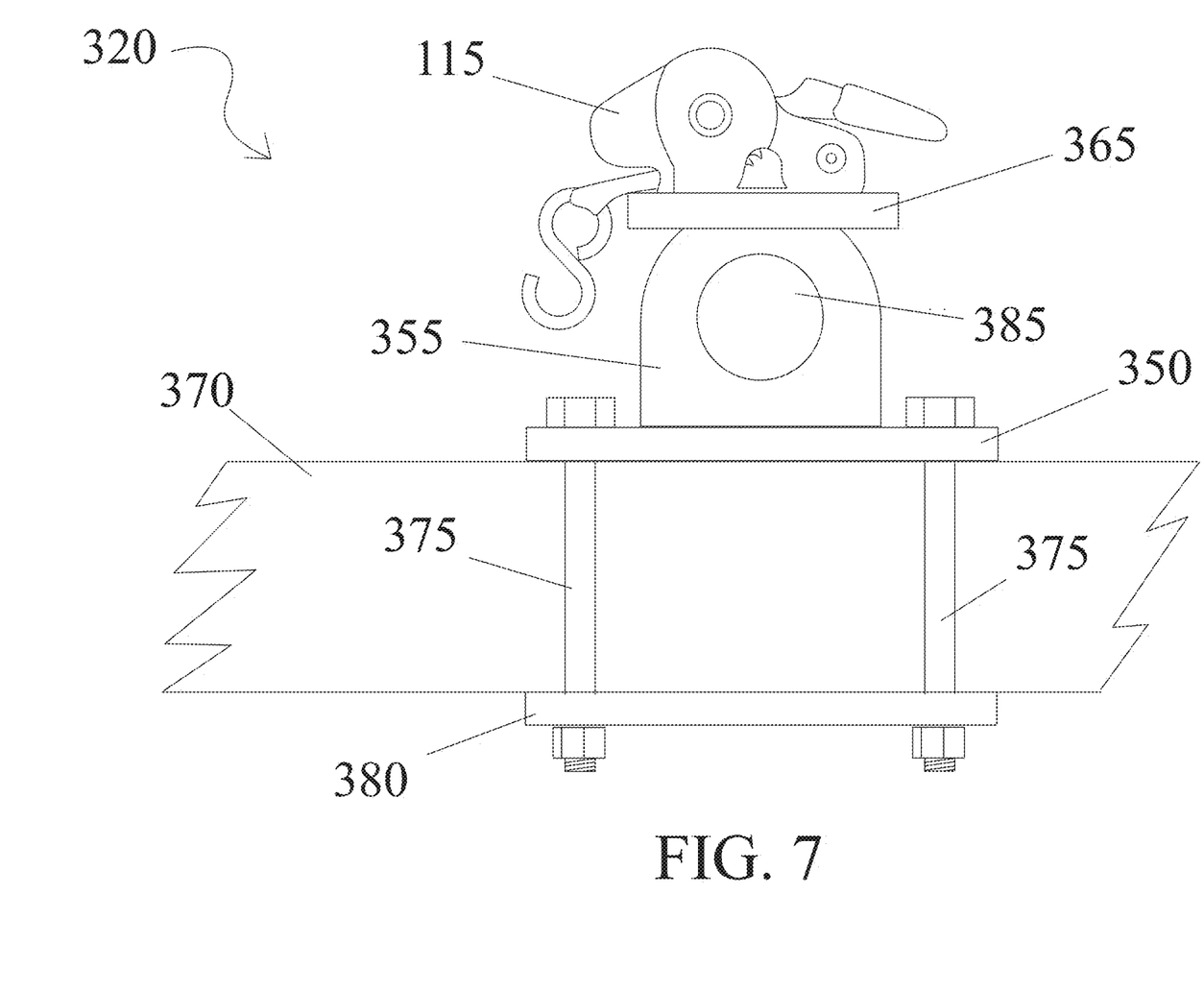
FIG. 7 is a side view of the easy trailer hitch attachment hold-down device shown in FIG. 6 attached to a trailer tongue.

Referring now to FIG. 3, an easy trailer hitch attachment hold-down device 300 is shown having an attachment plate 310. Attachment plate 310 has a trailer ball hole 315 that is sized to fit over a selected trailer ball (not shown). A pair of ratchet tie-downs 115 are provided as discussed above.

Referring now to FIGS. 4-7, an easy trailer hitch attachment hold-down device 320 is shown having a lower mounting plate 380 and an upper mounting plate 350 that clamps to a trailer tongue 370 using bolts 375. Of course other means may be used to attach easy trailer hitch attachment hold-down device 320 as long as it is securely attached to trailer tongue 370. A plurality of mounting holes 360 are used to allow the user to securely fasten tongue easy trailer hitch attachment hold-down device 320 to any size trailer tongue. A vertical support 355 is welded to upper mounting plate 350 perpendicularly and supports an attachment plate 365. Attachment plate 365 has a pair of ratchet tie-downs 115 secured thereon. Ratchet tie-downs 115 are connected to attachment plate 350 as discussed above with bolts or other connecting means (not shown). Vertical support 355 includes an attachment hole 385 that is used to attach tie-down, ropes or other attachment means as discussed above.

Figure 8:
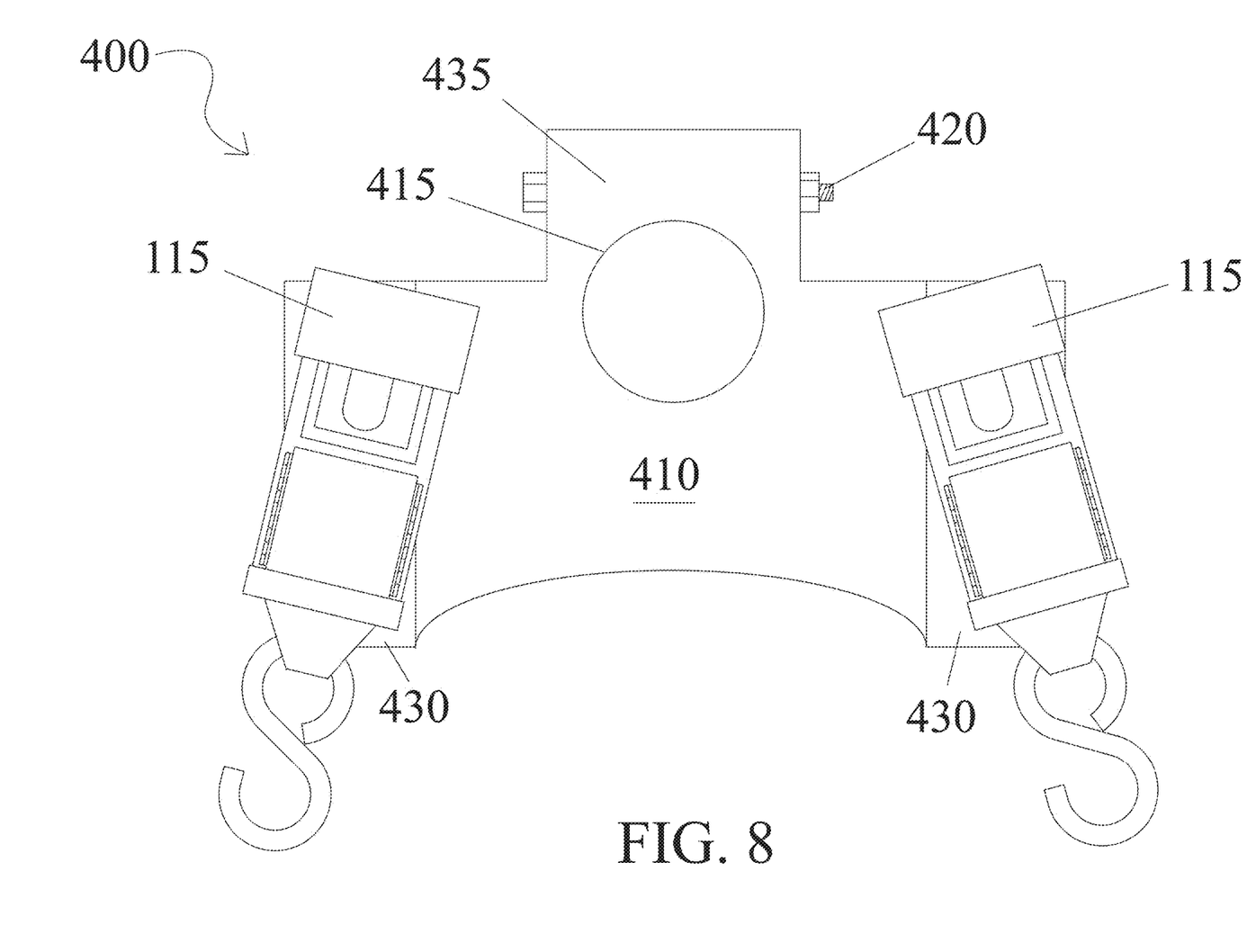
FIG. 8 is a top view of an easy trailer hitch attachment hold-down device according to an alternative embodiment of the invention.
Figure 9:
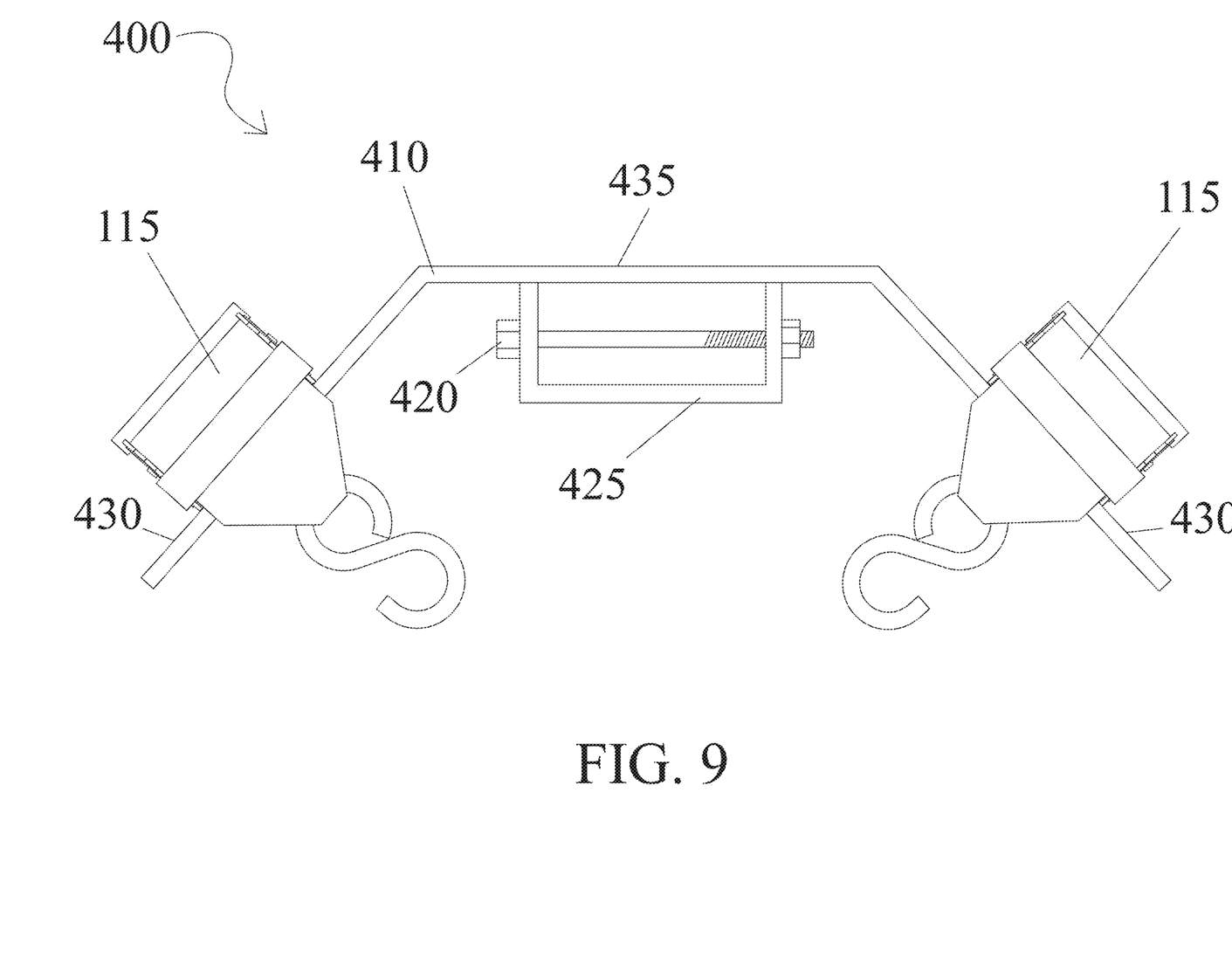
FIG. 9 is a front view of the easy trailer hitch attachment hold-down device shown in FIG. 8.
Figure 10:
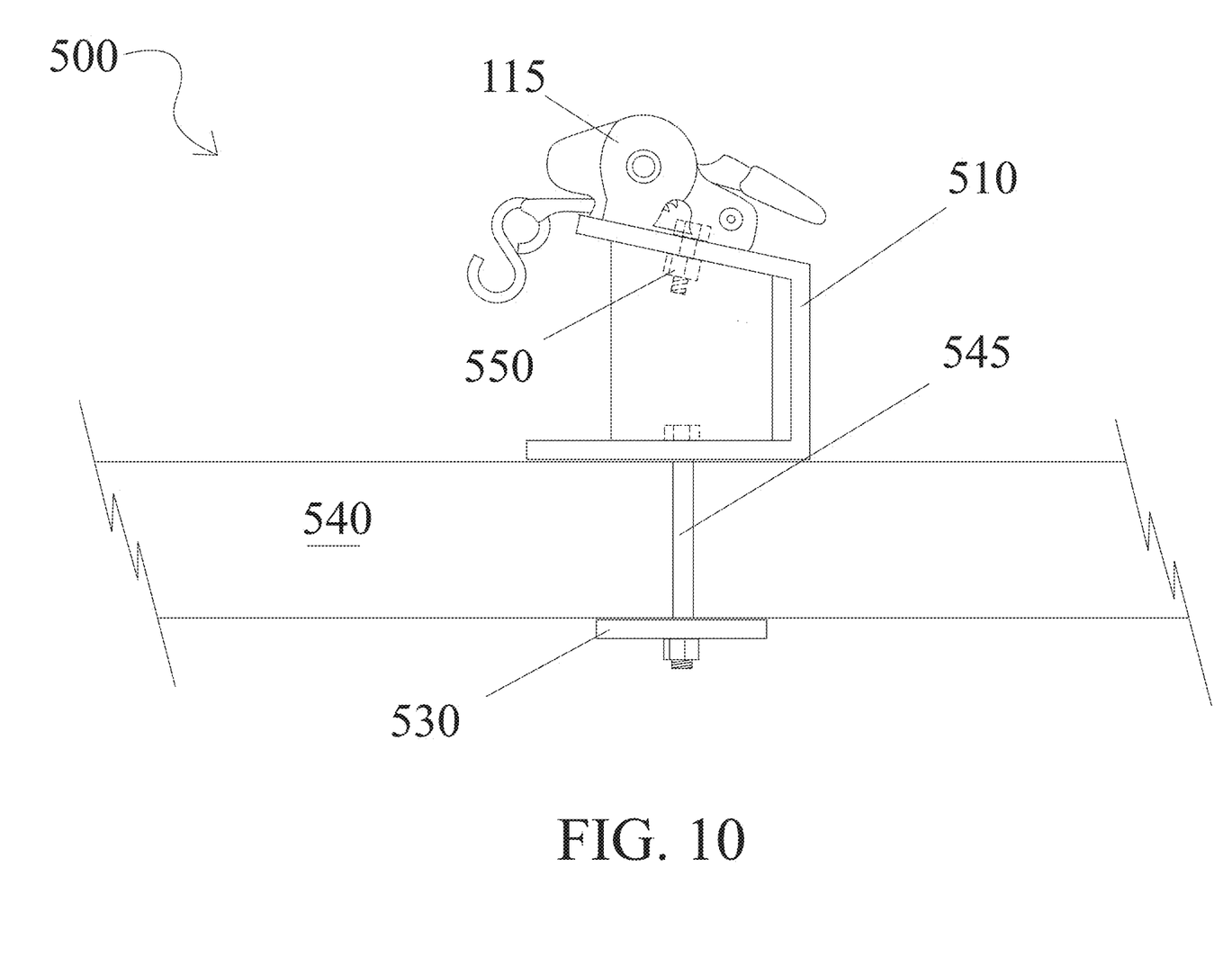
FIG. 10 is a side view of an easy trailer hitch attachment hold-down device attached to a trailer frame according to an embodiment of the invention.
Figure 11:
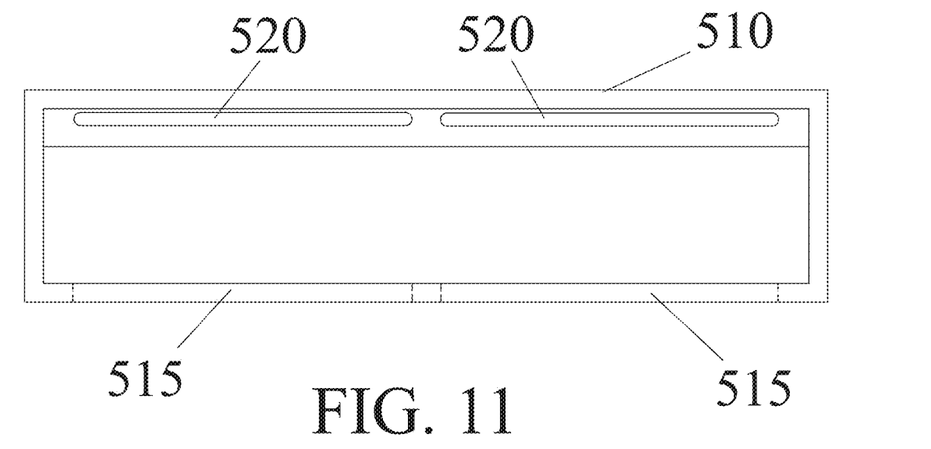
FIG. 11 is a front view of a stand-off attachment bracket shown in FIG. 10.
Figure 12:
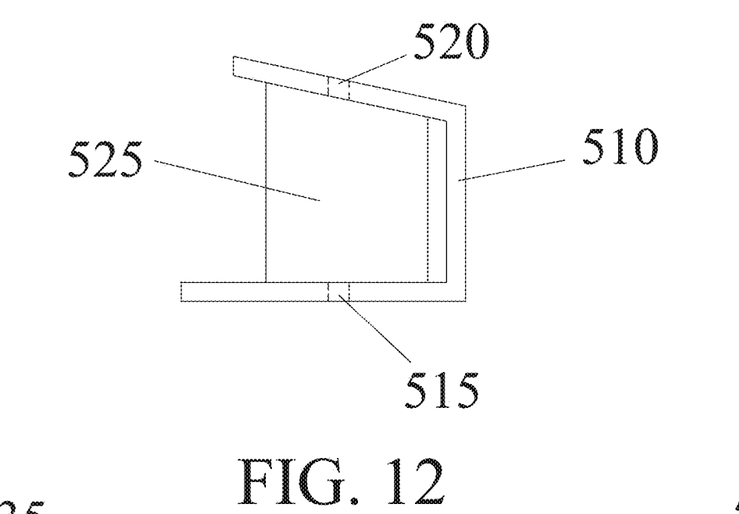
FIG. 12 is a side view of the stand-off attachment bracket shown in FIG. 10.
Figure 13:
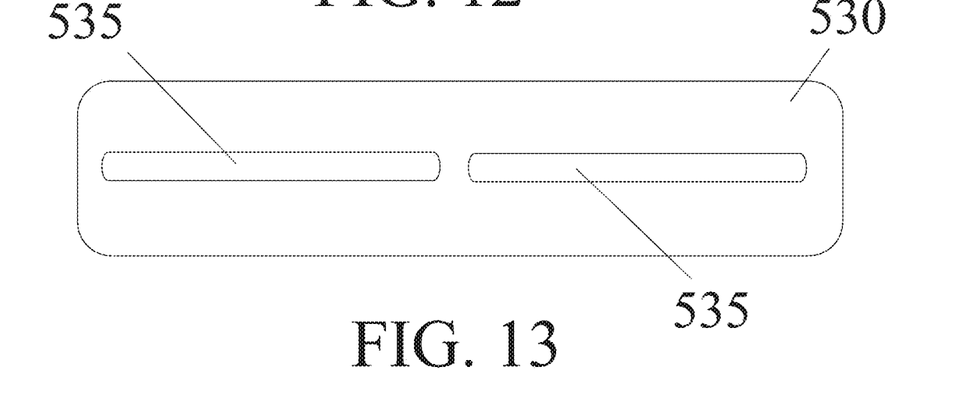
FIG. 13 is a top view of an attachment plate used with the stand-off attachment bracket shown in FIG. 10.

Now referring to FIGS. 8 and 9, a trailer hitch attachment hold-down device 400 is shown having an attachment plate 410 that has two angled side portions 430 and a center portion 435. A trailer ball opening 415 is disposed within center portion 435 and fits over a trailer ball (not shown). A U-shaped hitch attachment portion 425 is used to secure attachment plate 410 to a trailer hitch (not shown) using an attachment bolt 420. Of course other means of attaching attachment plate 410 may be used to attach trailer hitch attachment hold-down device 400 to a trailer hitch as long as trailer hitch attachment hold-down device is secured to the trailer hitch. Ratchet tie-down 115 are attached to side portions 430.

Referring to FIGS. 10-13, a trailer hitch attachment hold-down device 500 is shown having a stand-off attachment bracket 510. Stand-off attachment bracket 510 has two ratchet tie-down attachment slots 520 in an upper portion and two lower attachment slots 515. A ratchet tie-down bolt 550 is used to attach ratchet tie-down 115 to stand-off attachment bracket 510 as is known in the art. Of course, other methods of attaching ratchet tie-down may be used. A side wall 525 is provided to add structural support. The upper portion is angled upwards to facilitate strapping objects (not shown) to the trailer (not shown); however, in some embodiments stand-off attachment bracket is U-shaped (not shown). Trailer hitch attachment hold-down device 500 is attached to a trailer frame 540 using an attachment plate 530. Attachment plate 530 has two attachment plate slots 535. Trailer hitch attachment hold-down device 500 is place on a selected portion of trailer frame 540 and a pair of bolts 545 are secured through lower attachment slots 515 and attachment plate slots 535.

Figure 14:
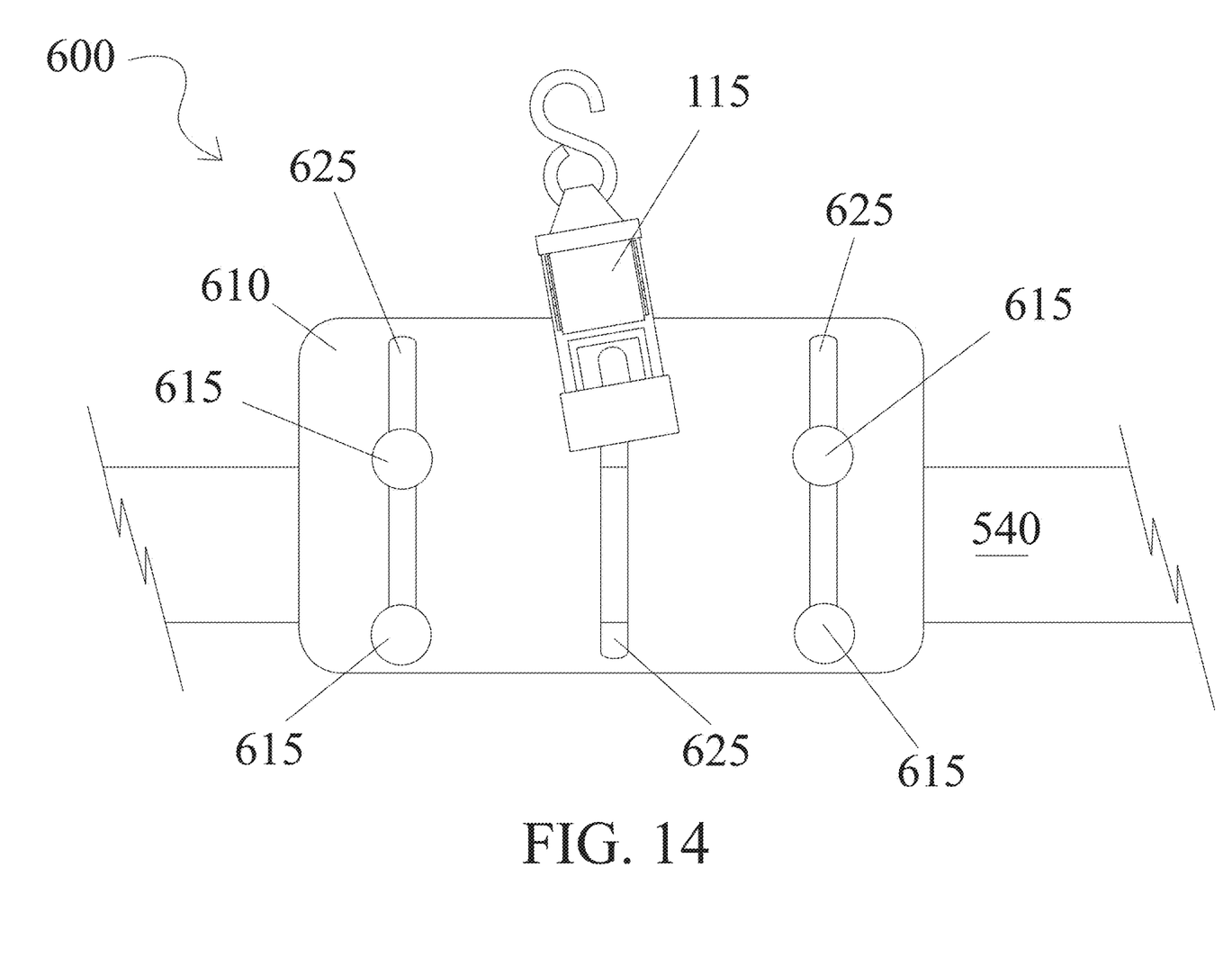
FIG. 14 is a top view of an easy trailer hitch attachment hold-down device attached to a trailer frame according to an embodiment of the invention.
Figure 15:
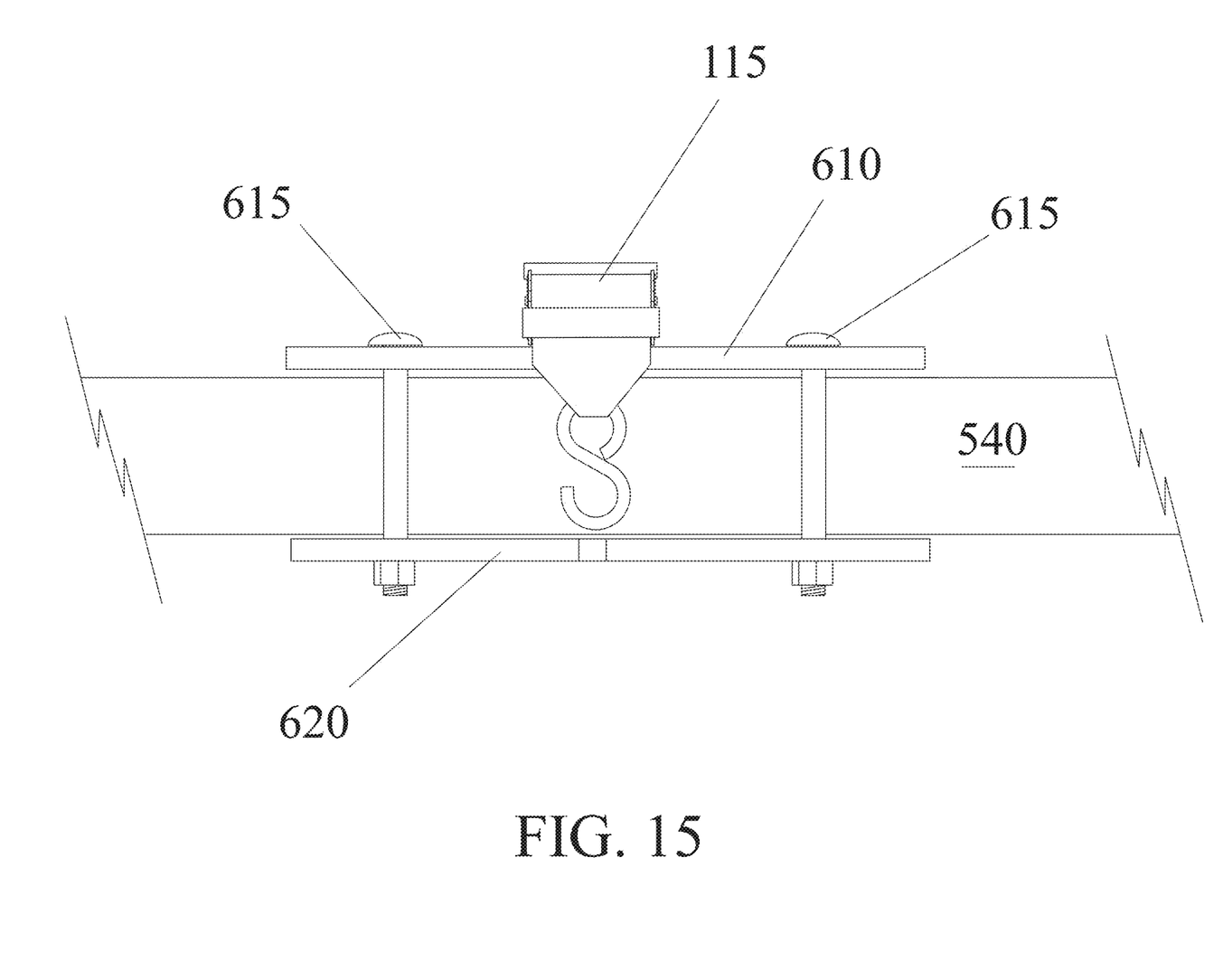
FIG. 15 is a side view of the easy trailer hitch attachment hold-down device shown in FIG. 14.

Referring now to FIGS. 14 and 15, a trailer hitch attachment hold-down device 600 is shown using an upper attachment plate 610 and a lower attachment plate 620 which straddle trailer frame 540 and secured using four carriage bolts 615 which fit through slots 625. Ratchet tie-down 115 is attached to slot 625.

In all the embodiments shown in the figures, the trailer hitch attachment hold-down device is made of metal such as steel or aluminum. Of course other materials may be used.

Although the instant invention has been described in relation to particular embodiments thereof, many other variations and modifications and other uses will become apparent to those skilled in the art.

What is claimed is:

1. A trailer hitch attachment hold-down device for providing attachment points to a trailer frame lacking hold-down points comprising:
    a trailer attachment plate;
    said trailer attachment plate adapted for attachment to a trailer tongue;
    wherein said trailer attachment plate provides at least one hold-down point for use with said trailer;
    said trailer attachment plate having a central portion and two side portions;
    a trailer hitch ball opening disposed on said central portion therein wherein said trailer hitch attachment hold-down device is secured in place when a trailer ball hitch is installed through said trailer ball hitch opening; and
    at least one ratchet tie-down attached to said trailer attachment plate.

2. The trailer hitch attachment hold-down device according to claim 1 wherein said side portions are angled from said central portion.

3. The trailer hitch attachment hold-down device according to claim 2 further comprising a U-shaped hitch attachment portion disposed on a lower surface of said central portion wherein said trailer hitch hold-down device is attached to a trailer hitch using a bolt.

4. The trailer hitch attachment hold-down device according to claim 1 wherein said trailer attachment plate is substantially flat.

5. The trailer hitch attachment hold-down device according to claim 4 further comprising;
    a lower attachment plate substantially identical to said trailer attachment plate;
    said trailer attachment plate and said lower attachment plates having a side opening disposed therein on each one of said side portions;
    a plurality of fasteners removably disposed within said side openings wherein a trailer frame is secured between said trailer attachment plate and said lower attachment plate by said plurality of fasteners; and
    a center opening disposed in said central portion wherein said at least one ratchet tie-down is secured within said center slot.

6. The trailer hitch attachment hold-down device according to claim 5 wherein said side opening and said center opening are slots.

7. The trailer hitch attachment hold-down device according to claim 1 further comprising at least one hold down opening disposed in said central portion.

8. The trailer hitch attachment hold-down device according to claim 1 wherein said at least one ratchet tie-down is rotatably disposed thereon.

9. A trailer hitch attachment hold-down device for providing attachment points to a trailer frame lacking hold-down points comprising:
    an attachment plate;
    said attachment plate having at least one ratchet tie-down secured to a top surface thereon;
    said attachment plate adapted for attachment to a trailer tongue;
    wherein said attachment plate provides at least one hold-down point for use with said trailer;
    an upper mounting plate;
    a lower mounting plate;
    a vertical support centrally fixedly attached on a lower surface of said attachment plate and on an upper surface of said upper mounting plate; and
    said upper and lower mounting plates having a plurality of coinciding mounting holes adapted to accept bolts wherein a trailer tongue is clamped between said upper and lower mounting plates when said bolts are attached therein.

10. The trailer hitch attachment hold-down device according to claim 9 further comprising an attachment hole disposed within said vertical support.

11. The trailer hitch attachment hold-down device according to claim 9 wherein said at least one ratchet tie-down is rotatably disposed thereon.

12. A trailer hitch attachment hold-down device for providing attachment points to a trailer frame lacking hold-down points comprising:
- a stand-off attachment bracket;
- said stand-off attachment bracket having a top portion, a wall portion and a bottom portion;
- at least one upper opening disposed within said top portion;
- at least one lower opening disposed within said bottom portion;
- an attachment plate;
- said attachment plate adapted for attachment to a trailer tongue;
- wherein said attachment plate provides at least one hold-down point for use with said trailer;
- said attachment plate having at least one coinciding opening with said at least one lower opening wherein a fastener is removably disposed within said at least one lower opening and said at least one coinciding opening wherein a trailer frame is clamped between said bottom portion and said attachment plate; and
- at least one ratchet tie-down attached to said top portion.

13. The trailer hitch attachment hold-down device according to claim 12 wherein said at least one upper opening and said at least one lower opening is a slot.

14. The trailer hitch attachment hold-down device according to claim 12 wherein said at least one ratchet tie-down is rotatably disposed thereon.

* * * * *